(12) United States Patent
Chandrashekar et al.

(10) Patent No.: US 11,902,625 B2
(45) Date of Patent: Feb. 13, 2024

(54) SYSTEMS AND METHODS FOR PROVIDING FOCUSED CONTENT

(71) Applicant: Rovi Guides, Inc., San Jose, CA (US)

(72) Inventors: Padmassri Chandrashekar, Karnataka (IN); Daina Emmanuel, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/362,701

(22) Filed: Jun. 29, 2021

(65) Prior Publication Data
US 2022/0417604 A1   Dec. 29, 2022

(51) Int. Cl.
*H04N 21/4728* (2011.01)
*H04N 21/442* (2011.01)
*H04N 21/4725* (2011.01)

(52) U.S. Cl.
CPC ... *H04N 21/4728* (2013.01); *H04N 21/44218* (2013.01); *H04N 21/4725* (2013.01)

(58) Field of Classification Search
CPC ......... H04N 21/4728; H04N 21/44218; H04N 21/4725
See application file for complete search history.

(56) References Cited

U.S. PATENT DOCUMENTS

| 2012/0246218 | A1* | 9/2012 | Adimatyam | H04N 21/2343 709/203 |
| 2019/0045269 | A1* | 2/2019 | Fujimori | H04N 21/85406 |
| 2022/0321931 | A1* | 10/2022 | Panje | H04N 21/2387 |

* cited by examiner

*Primary Examiner* — Kunal Langhnoja
(74) *Attorney, Agent, or Firm* — Haley Guiliano LLP

(57) ABSTRACT

Systems and methods are provided herein for presenting a focused display of content. A content item is generated for display and an index map is received for the content item. The index map correlates the content item, for example, a region of the content item, to the focused content. A focus indicator can be simultaneously displayed with the content item to inform a viewer of the availability of the focused content. A selection to present the focused content is received and in response, and based on the index map, the focused content is generated for display, thereby enabling a viewer to have a personalized viewing experience.

18 Claims, 9 Drawing Sheets

SYSTEMS AND METHODS FOR PROVIDING FOCUSED CONTENT

BACKGROUND

The present disclosure relates to systems and methods for providing focused content and, more particularly, to providing focused content using an index map, which correlates a content item to the focused content.

SUMMARY

Consuming content has drastically evolved within recent years due to the changes in which content is experienced and the viewership personalization made available to users. As opposed to cable television, a large demographic of people purely stream their content via content providers (e.g., Netflix, Hulu, Amazon Prime Video, Disney+, etc.). Viewer personalization typically takes the form of content providers offering content recommendations to users based on their viewing history, viewing patterns, and viewing frequency, all of which comprise a user profile content providers use to further personalize the user experience. Providers present content in sub-categories (e.g., Favorites, Recently Watched, Popular in the U.S., or If you enjoyed [insert show title]) and even identify shows a user's friend has recently watched to recommend the same content to the user.

Viewership personalization has made significant strides but hasn't reached the point where users can choose to focus on specific objects of interest or a region of interest within a content item while the content item proceeds to play, which means any given content item will be viewed the same way by all users. In contrast, the systems and methods of the present disclosure use an index map to identify objects or regions of a content item with, for example, coordinates or metadata, allowing a user to focus on a particular object or region of the content item. The index map can be used with various types of content to allow a user to focus in on objects or regions of interest. For example, for a sporting event, an index map can be used to identify each player on a field with either coordinates or metadata, giving the user the ability to focus on their favorite player while the game continues. Today, no content supports this flexibility and interactivity.

Accordingly, the systems and methods described herein use an index map, which correlates a content item to focused content, for presenting a focused display of content. In some embodiments, a master playlist for a content item is received, which comprises a video playlist (e.g., a m3u file) and an audio playlist (e.g., a m3u file) for the content item, and the index map. In some embodiments, the focused content is a zoomed-in portion of the master playlist for a content item, and the index map identifies the object or region within the master playlist that is to be enlarged. In some embodiments, where the focused content is separate from the content item, the master playlist further comprises a focused playlist. For such embodiments, the index map correlates an object or region of the content item (e.g., using coordinates or metadata) to the focused playlist. A focus indicator can be automatically and simultaneously displayed with the content item to identify the object or region for which focused content is available. Upon user selection, the index map is used to obtain and present the focused content for display.

These techniques solve the problems of other approaches described above. In particular, these techniques allow a user to zoom in to or focus on objects or portions of a content item, thus providing an interactive personalized viewing experience while watching a content item. The other approaches that, for example, may recommend content based on a user profile still fail to provide an immersive experience where a user can closely follow a preferred object (e.g., actor or player) or region of a content item.

In some embodiments, the systems and methods disclosed herein describe presenting a focused display of content using an index map. The system receives an index map for a content item, where the index map correlates the content item to focused content. The system generates for display the content item. The system receives a selection to present the focused content, and in response to receiving the selection and based on the index map, generates for display the focused content.

In some embodiments, the index map may correlate a region of the content item to the focused content. For example, the index map may identify the pixel coordinates of the region for which focused content is available.

In some embodiments, the system may simultaneously display an indicator of the region of the content for which the focused content is available. For example, if a user is watching a soccer game, the system may indicate that one or more players on the field are available to be viewed as focused content while the game continues.

In some embodiments, the system may generate for display the focused content by enlarging a region of the content item by cropping the content item based on the index map. For example, if the index map correlates a lion in a nature documentary to focused content, the system may crop around the lion from the nature documentary for an enlarged view. In some embodiments, the system may generate for display the enlarged view of the region by upsampling the region of the content item to generate the enlarged view. For example, if the index map correlates a soccer player during a game as focused content, the system may display the enlarged view of the soccer play by increasing the region's resolution to match the original resolution of the content item.

In some embodiments, the index map correlates the content item to focused content based on metadata (e.g., name of actor, name of player, type of animal).

In some embodiments, the system receives a master playlist for the content item, where the master playlist comprises the index map. In some embodiments, the master playlist may comprise a video playlist for the content item, where the video playlist identifies a plurality of segments that comprise the content item. In some embodiments, the master playlist may further comprise a focused playlist for the focused content, where the focused playlist identifies one or more segments that comprise the focused content. Generating for display the focused content may comprise switching from a segment of the video playlist for the content item to a segment of the focused playlist for the focused content.

In some embodiments, the system may determine user behavior based on selections to present focused content. The system may then automatically generate for display focused content based on the user behavior. For example, if a user frequently selects Paul Pogba as the focused content when watching Manchester United play, the system may automatically focus on Paul Pogba the next time the user watches Manchester United and focused content for Paul Pogba is available.

BRIEF DESCRIPTION OF THE DRAWINGS

The above and other objects and advantages of the disclosure will be apparent upon consideration of the following detailed description, taken in conjunction with the accompanying drawings, in which.

Figure 1:
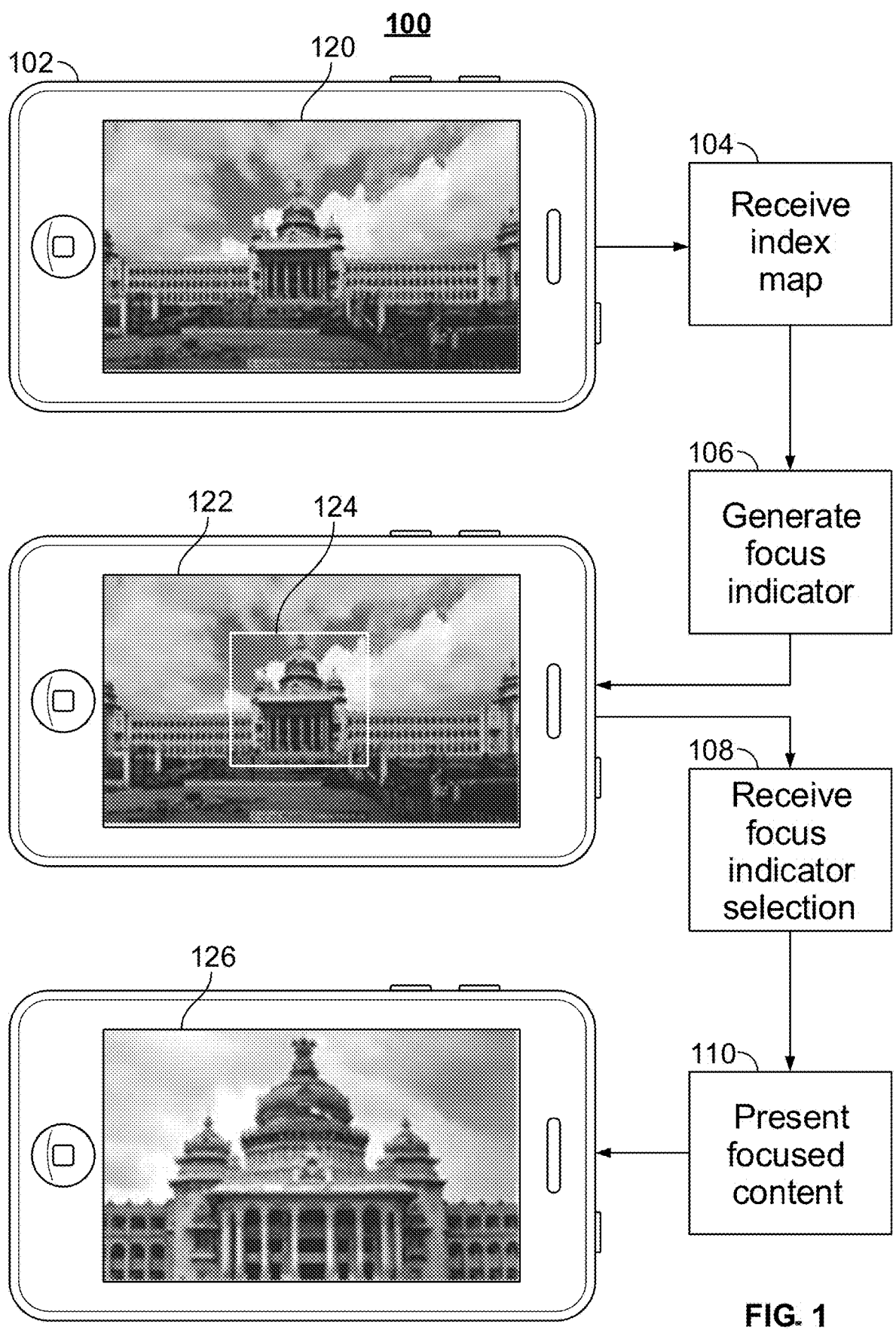
FIG. 1 shows an example of a scenario for presenting a content item and focused content on a user device using an index map, in accordance with some embodiments of the present disclosure.

The figures herein depict various embodiments of the disclosure for purposes of illustration only. It will be appreciated that additional or alternative structures, systems, and methods may be implemented within the principles set out by the present disclosure.

DETAILED DESCRIPTION

Methods and systems are provided herein for presenting a focused display of content using an index map. The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, random access memory (RAM), etc.

As referred to herein, the term "manifest" should be understood to refer to a file and/or a data structure containing information about sequential segments (comprising sequential frames) of a media asset that is available to a client device. Such information may include, e.g., a number of segments in a playlist, bit rates of each segment, codecs associated with each segment, resolution of each segment, parental rating associated with each segment, timing of each segment, location on the network where a segment may be retrieved, bandwidth of each segment, video tracks of each segment, audio tracks of each segment, subtitle tracks of each segment, captions of each segment, languages of each segment, metadata associated with each segment, etc.

The manifest may be employed in any of a variety of streaming protocols, e.g., media presentation description (MPD) files for Dynamic Adaptive Streaming over HTTP (MPEG-DASH), m3u8 files for HTTP Live Streaming (HLS), f4m files for HTTP Dynamic Streaming (HDS), ingest files for CMAF (Common Media Application Format), manifest files for Microsoft Smooth Streaming (MSS), etc. The manifest may be a standard manifest (e.g., an MPD file from MPEG-DASH) or may be a modified version of a standard manifest. A segment may comprise information (e.g., encoded video, audio, subtitle information, error correction bits, error detection bits, etc.) for a particular interval of a media asset, and each segment may correspond to a file specified in the manifest indicating an associated URL for retrieving the file. The segment may comprise a collection or sequence of frames (e.g., still images that together make up moving pictures of scenes of a portion of a media asset), and each segment may have a specific length (e.g., a few seconds). In the segment-based delivery of media content using the above-mentioned streaming protocols, various techniques may be employed (e.g., MPEG-2 Transport stream format, MPEG-4 format such as the fragmented MPEG-4 format). In some embodiments, a master playlist is an example of a manifest.

FIG. 1 shows an example of a scenario for presenting a content item and focused content on user device 102 using an index map, in accordance with some embodiments of the present disclosure. In some embodiments, one or more parts of or the entirety of the user device 102 is configured as a system implementing various features, processes, and components of FIGS. 2-9. The user device 102 may include control circuitry that receives a content item and generates for display the content item as shown in view 120. The user device 102 may receive the content item from either a media content source or a content database via a communications network. In some embodiments, the user device 102 uses a manifest file such as a master playlist to retrieve the content item for display. The master playlist includes, for the content item, a video playlist (e.g., a m3u file) and an audio playlist (e.g., a m3u file). The content item may be accessed via a user input interface (e.g., a touchscreen display) and presented on a display. In some embodiments, the content item may represent a live media content item accessed by a media guidance application. In some embodiments, the content item may represent video-on-demand (VOD) content.

The user device 102 receives an index map at step 104. In some embodiments, the index map is included in the master playlist and may be received before the content item is generated for display. In some embodiments, the index map is received separate from a master playlist and can be received while a content item is being displayed. The index map identifies focused content that is available for the content item. For example, the index map can correlate a region of the content item to the focused content. The region can be identified using, for example, coordinates (e.g., which may correlate to bitrate variants of a master playlist) or metadata (e.g., player name, actor name, type of animal). The region of the content item may be a portion of a frame of the content item for which the focused content is available.

At step 106, the user device 102 generates a focus indicator 124 and simultaneously displays it with the content item as shown in view 122. The focus indicator 124 identifies a region of the content item that is available to be focused. As shown in view 122, focus indicator 124 identifies the center portion of a building as having focused content available for display.

At step 108, the user device 102 receives a selection of the focus indicator. For example, the selection may be received from a user via a user input interface. In response, at step 110, the user device 102 generates for display the focused content based on the index map as shown in view 126. For example, the user device 102 can use the index map to retrieve the focused content (e.g., where the index map identifies a focused playlist or a source or location of the focused content) or generate the focused content from the content item (e.g., where the index map identifies the coordinates of the focused content to be enlarged). As illustrated, the focused content shows an enlarged view of the center of the building of the content item. In some embodiments, the content item may be an advertisement showing multiple products and focus indicators can be used to allow a user to select and view focused content for a product of interest. While the user device 102 is depicted as a smartphone, the user device 102 may be implemented as user television equipment 502, user computer equipment 504, or wireless user communications device 506 in system 500 of FIG. 5, or any other type of user equipment suitable for accessing content. The control circuitry of user device 102 may comprise processing circuitry and storage (e.g., RAM, ROM, hard disk, removable disk, etc.). In some embodiments, the control circuitry may receive a manifest (e.g., master playlist) for the content item.

In some embodiments, user behavior is used to automatically select focused content. For example, prior focus selections can be stored in a user profile database and used to automatically select similar focused content in place of steps 106 and 108. In some embodiments, the focused content may be cropped based on the index map. For example, if the index map correlates a lion in a nature documentary to focused content, the system may crop around the lion from the nature documentary to generate an enlarged view as the focused content. In some embodiments, the focused content may be upsampled to generate the enlarged view. For example, if the index map correlates a soccer player during a game as focused content, the system may display an enlarged view of the soccer player by increasing the region's resolution to match the original resolution of the content item.

Figure 2:
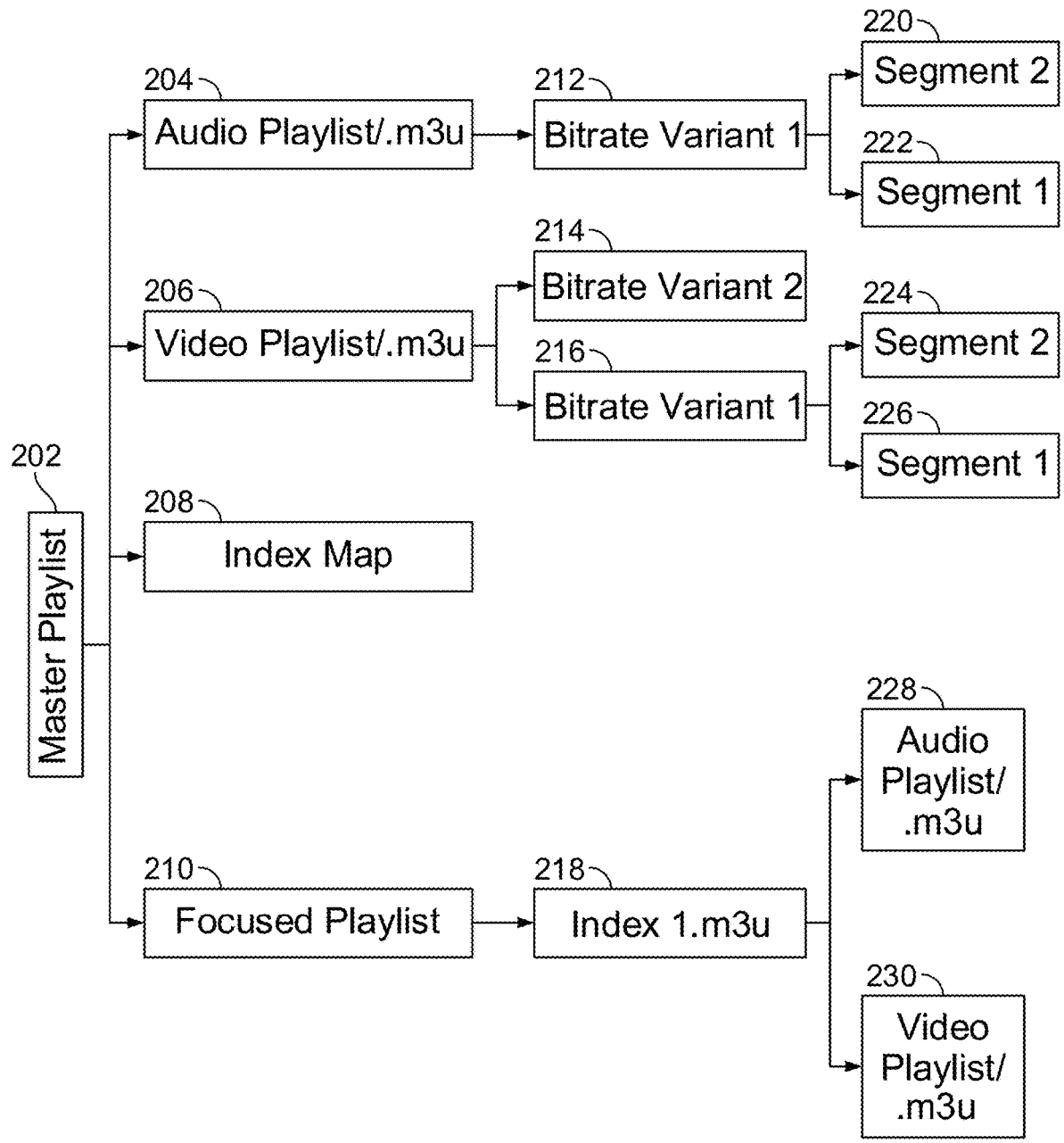
FIG. 2 shows an illustration of an example master playlist for a content item having an index map and focused playlist associated with a video and audio playlist of the master playlist, in accordance with some embodiments of the present disclosure.

FIG. 2. shows an illustration of an example master playlist 202 for a content item having an index map 208 and focused playlist 210 associated with a video playlist 206 and audio playlist 204 of the manifest, in accordance with some embodiments of the present disclosure. In some embodiments, master playlist 202 for the content item may comprise the index map 208, the video playlist 206 (e.g., a m3u file), and the audio playlist 204 (e.g., a m3u file), without focused playlist 210. The index map 208 correlates the video playlist 206 for the content item to the focused content. The index map 208 may correlate a region of the video playlist 206 for the content item to focused content. The region of the video playlist 206 for the content item may be a portion of a frame of the video playlist 206 for the content item for which the focused content is available. In some embodiments, the index map 208 may comprise coordinates of the region of the video playlist 206 for the content item. The coordinates of the region of the video playlist 206 for the content item may correlate to bitrate variants (e.g., 214 and 216) of the video playlist 206 for the content item and the focused content. In some embodiments, the index map 208 may correlate the video playlist 206 for the content item to focused content based on metadata (e.g., player name, actor name, type of animal). In some embodiments, the focused content may be cropped based on the index map 208. For example, if the index map 208 correlates a lion in a nature documentary to focused content, the system may crop around the lion from the nature documentary for an enlarged view. In some embodiments, the focused content may be upsampled to generate an enlarged view. For example, if the index map 208 correlates a soccer player during a game as focused content, the system may display an enlarged view of the soccer player by increasing the region's resolution to match the original resolution of the content item. The video playlist 206 for the content item, which may comprise at least one bitrate variant (e.g., 214 and 216), may identify a plurality of segments (e.g., 226 and 224) that comprise the content item. The audio playlist 204 for the content item, which may comprise a bitrate variant 212, may identify a plurality of segments (e.g., 220 and 222) that comprise the content item.

In some embodiments, the master playlist 202 for the content item may comprise the index map 208, the video playlist 206 (e.g., a m3u file), the audio playlist 204 (e.g., a m3u file), and the focused playlist 210. In some embodiments, the focused playlist 210 for the focused content may identify one or more segments that comprise the focused content. In some embodiments, there may be more than one item of focused content, and each additional focused content will have its own index (e.g., Index 2, Index 3, etc.) with corresponding, different bitrate variants for each index. The focused playlist 210 for the focused content may be used to generate for display the focused content by switching from a segment (e.g., 224 or 226) of the video playlist 206 for the content item to a segment of the focused playlist 210 for the focused content. The focused playlist 210 may comprise an index playlist 218 (e.g., a m3u file), which may further comprise an audio playlist 228 and a video playlist 230. In some embodiments, the index map 208 may correlate the video playlist 206 for the content item to the focused playlist 210 for the focused content. In some embodiments, the index map 208 may correlate the video playlist 206 for the content item to the focused playlist 210 for the focused content based on metadata (e.g., player name, actor name, type of animal, coordinates). The video playlist 206 for the content item, which may comprise at least one bitrate variant (e.g., 214 and 216), may identify a plurality of segments (e.g., 226 and 224) that comprise the content item. The audio playlist 204 for the content item, which may comprise a bitrate variant 212, may identify a plurality of segments (e.g., 220 and 222) that comprise the content item. In some embodiments, where the focused content may be an enlarged region of the content item, there would be no focused playlist 210 in the master playlist 202.

As referred to herein, a "media guidance application" is an application that provides media guidance data to a user through an interface. For example, a media guidance application may allow users to efficiently navigate content selections and easily identify content that they may desire. The media guidance application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, random access memory (RAM), etc.

As referred to herein, the phrase "index map," "coordinates," "metadata," "content data," and "user profile data" should be understood to mean any data related to content or data used in operating the content item, focused content, master playlist, or focused playlist. For example, the data may include program information, playlist information, bitrate variant information, segment information, focus indicator selection information, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of data that is helpful for a user to navigate among and locate desired content selections.

As referred to herein, the terms "media content," "content item," "focused content," "master playlist," "focused playlist," "video playlist," and "audio playlist" should be understood to mean an electronically consumable user asset, such as a live televise program, as well as pay-per-view programs, on-demand programs (as in video-on-demand (VOD) systems), Internet content (e.g., streaming content, downloadable content, webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate and locate content.

As referred to herein, the phrases "user equipment device" and "user device" should be understood to mean any device that accesses the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same.

As referred to herein, the phrase "control circuitry," "input circuitry," "transceiver circuitry," "comparison circuitry," and "output circuitry" should be understood to mean circuitry instructing any device that accesses the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same.

Figure 3:
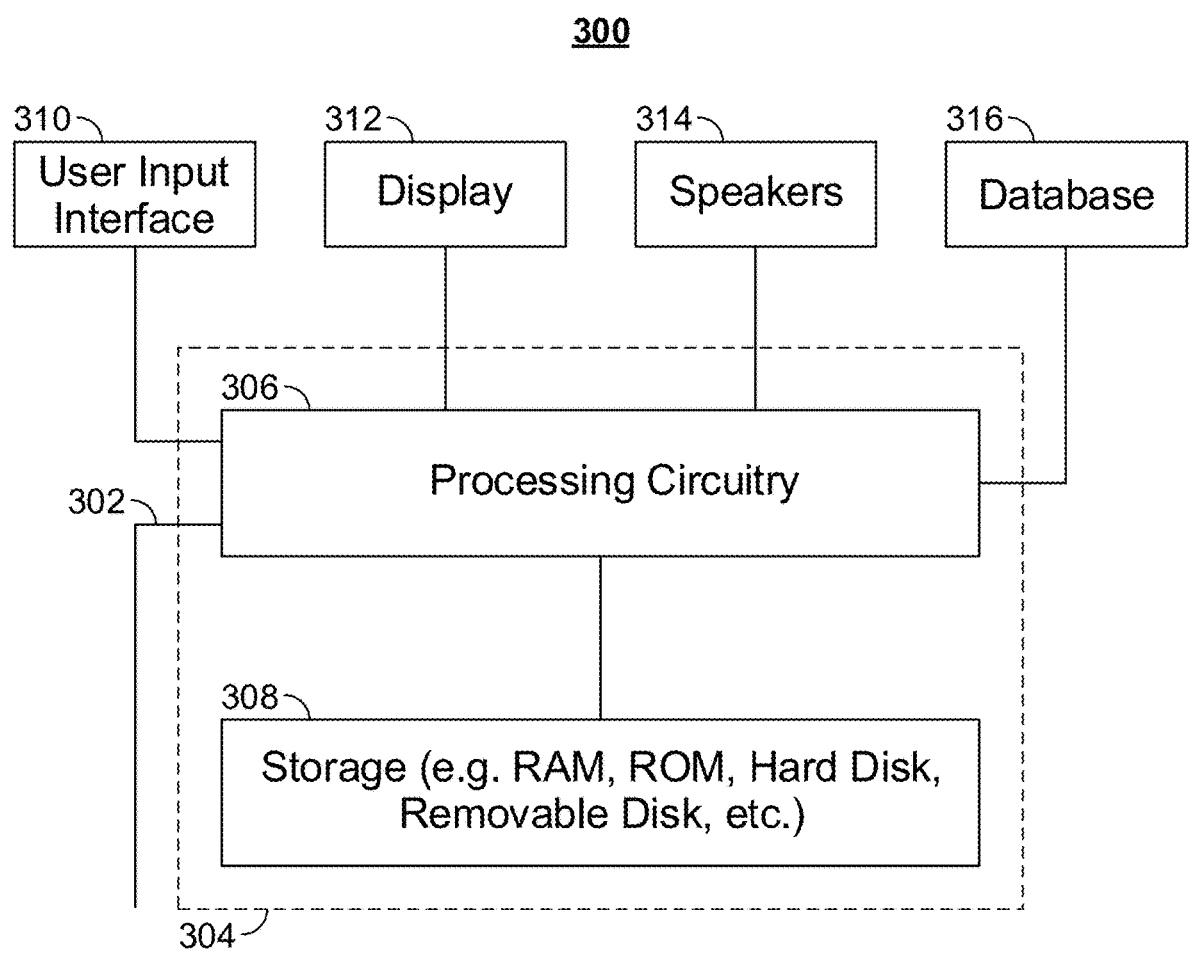
FIG. 3 shows an illustrative depiction of an example computing device, in accordance with some embodiments of the present disclosure.

Users may access content, as described above, and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., media content, content item, focused content, master playlist 202, focused playlist 210, video playlist 206, audio playlist 204) and data (e.g., index map 208, coordinates, metadata, content data, user profile data) to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field programmable gate arrays (FPGAs), application-specific integrated circuits (ASICs), etc., and may include a multi-core processor (e.g., dual-core, quad-core, hexacore, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a content item stored in memory (i.e., storage 308). Specifically, control circuitry 304 may be instructed by a manifest file or index map to perform the functions discussed above and below. For example, the index map may provide instructions to control circuitry 304 to generate the focused content item. In some implementations, any action performed by control circuitry 304 may be based on instructions received from the focus indicator selection.

In client-server based embodiments, control circuitry 304 may include communications circuitry suitable for communicating with a focus indicator server or other networks or servers. The instructions for carrying out the above-mentioned functionality may be stored on the focus indicator server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as content data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upsampling and downsampling content into the preferred output format of the user equipment 300. Circuitry 304 may also include digital-to-analog converter circuitry and analog-to-digital converter circuitry for converting between digital and analog signals.

The tuning and encoding circuitry may be used by the user equipment device to receive and to display, to play, or to record content. The tuning and encoding circuitry may also be used to receive content data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touchscreen, touchpad, stylus input, joystick, voice recognition interface, or other user input interfaces.

Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

In some embodiments, display 312 may be HDTV-capable. In some embodiments, display 312 may be a 3D display, and the focused content and any suitable content may be displayed in 3D. A video card or graphics card may generate the output to the display 312. The video card may offer various functions such as accelerated rendering of 3D scenes and 2D graphics, MPEG5 2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314. User equipment device 300 may also incorporate or be accessible to one or more other modules 316. For example, a content database 316 for storing content metadata, for example.

The master playlist 202 for the content item 102 may be implemented using any suitable architecture. For example, it may be a stand-alone playlist wholly implemented on user equipment device 300. In such an approach, instructions of the playlist are stored locally (e.g., in storage 308), and data (e.g., index map 208, coordinates, metadata, content data, user profile data) for use by the playlist is downloaded on a periodic basis (e.g., from an out-of-band feed, from an Internet resource, or using another suitable approach). Control circuitry 304 may retrieve instructions of the playlist from storage 308 and process the instructions to generate any of the focused content discussed herein. Based on the processed instructions, control circuitry 304 may determine what action to perform when input is received from input interface 310. For example, presentation of focused content may be indicated by the processed instructions when input interface 310 indicates that a focus indicator selection was received.

The user equipment device may receive the focused content generated by the remote server and may display the focused content locally on equipment device 300. This way, the processing of the instructions is performed remotely by the server while the resulting focused content is provided locally on equipment device 300. Equipment device 300 may receive inputs from the user via input interface 310 and transmit those inputs to the remote server for processing and generating the corresponding focused content. For example, equipment device 300 may transmit a communication to the remote server indicating that a focus indicator selection was received via input interface 310. The remote server may process instructions in accordance with that input and generate a focused content corresponding to the input. The generated focused content is then transmitted to equipment device 300 for presentation of the focused content.

Figure 4:
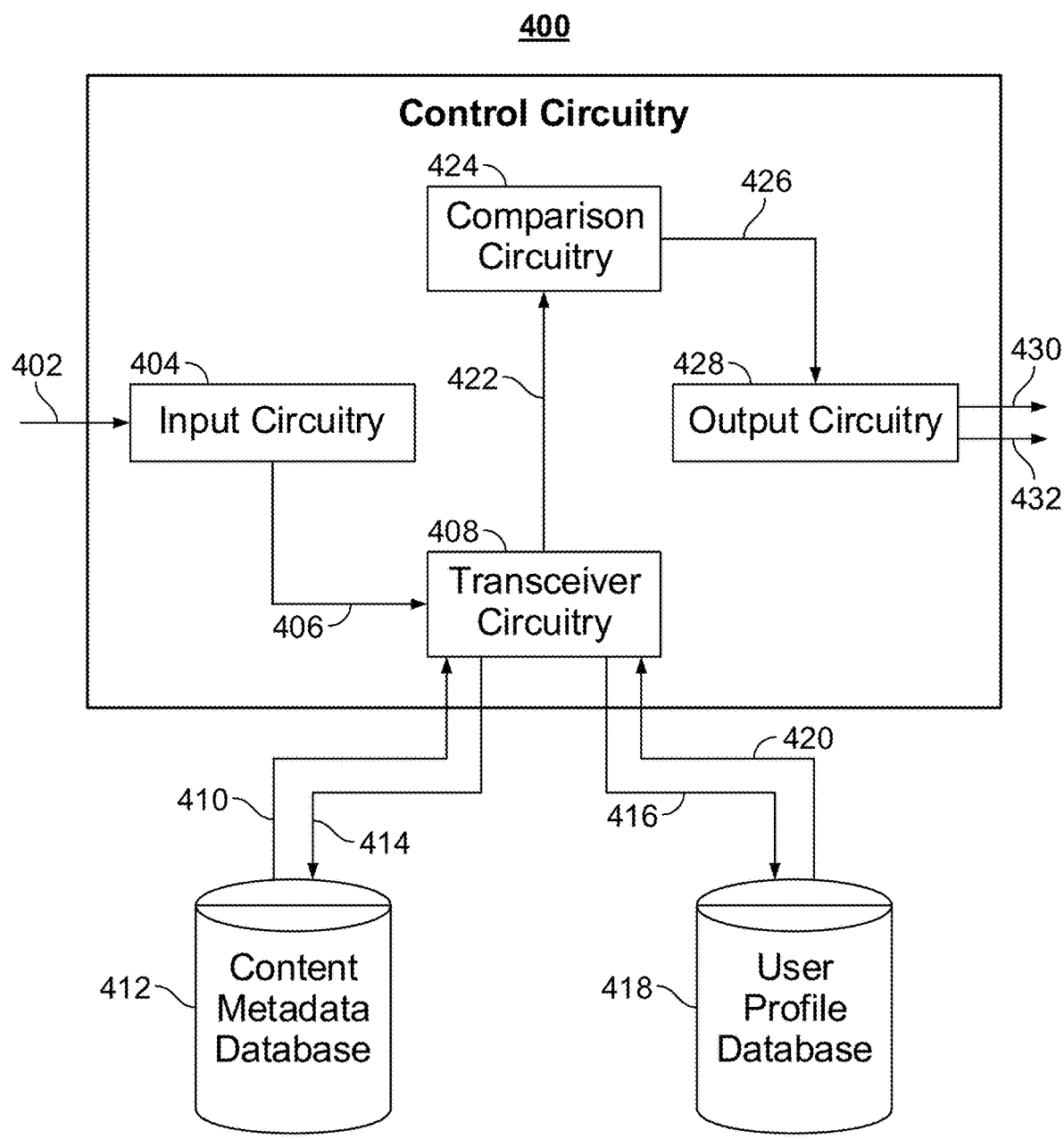
FIG. 4 shows an illustrative depiction of an example control circuitry for a computing device, in accordance with some embodiments of the present disclosure.

FIG. 4 is a block diagram showing components and data flow therebetween of an exemplary system for selectively playing back portions of video and audio of a content item, in accordance with some embodiments of the disclosure. Control circuitry 400 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 400 receives 402, using input circuitry 404, a command to perform a focused content operation. Input circuitry 404 may include a microphone and voice processing circuitry for receiving voice commands, infrared receiving circuitry for receiving commands from a remote control device, a touchscreen interface for receiving user interactions with graphical user interface elements (e.g., a focus indicator selection), or any combination thereof or any other suitable input circuitry for receiving any other suitable user input. In response to the command, input circuitry 404 generates a query for metadata of the content item and transmits 406 the query to transceiver circuitry 408 to be transmitted 410 to content metadata database 412. The query may be an SQL "SELECT" command, or any other suitable query format.

Transceiver circuitry 408 may be a network connection such as an Ethernet port, Wi-Fi module, or any other data connection suitable for communicating with a remote server. Transceiver circuitry 408 receives 414 from content metadata database 412, in response to the query, metadata describing segments of the content item. In some embodiments input circuitry 404 also generates a second query for user preference data. Transceiver circuitry 408 transmits 416 the second query to user profile database 418 and receives 420 from user profile database 418, in response to the query, user preference data.

Transceiver circuitry 408 transfers 422 the metadata to comparison circuitry 424. Comparison circuitry 424 identifies the segments of the content item that will be subject to the focused content operation and may analyze importance levels of audio, textual description or image frames to select for presentation during the focused content operation. Comparison circuitry 424 may also receive, or have access to, the current playback position and the length of moving window. Once the audio, textual description or image frames have been selected, comparison circuitry 424 transfers 426 the identifiers corresponding to the segments to output circuitry 428. Output circuitry 428 may decrease/increase the speed of video output 430 and, using the identifiers of the segments of the content item, outputs 432 of portions of the content item.

Figure 5:
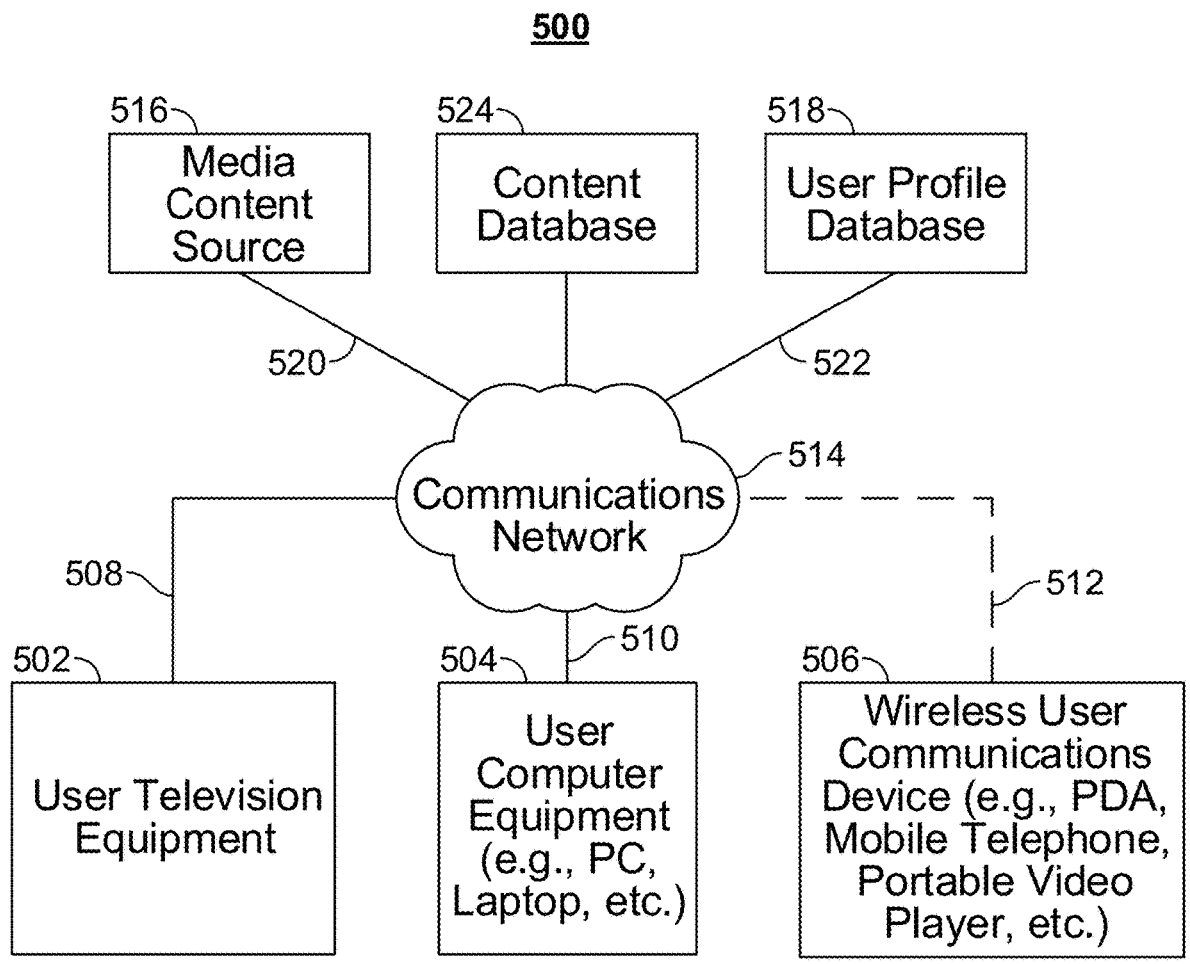
FIG. 5 shows a block diagram of an illustrative user equipment system, in accordance with some embodiments of the present disclosure.

User equipment device 300 of FIG. 3 can be implemented in system 500 of FIG. 5 as user television equipment 502, user computer equipment 504, wireless user communications device 506, or any other type of user equipment suitable for accessing content. For simplicity, these devices may be referred to herein collectively as user equipment, or user equipment devices, and may be substantially similar to user equipment devices described above. User equipment devices, on which focused content operation may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The focused content may have the same layout on various different types of user equipment or may be tailored to the display capabilities of the user equipment. For example, on user computer equipment 504, the focused content may be provided by a web browser. In another example, the focused content may be scaled down for wireless user communications devices 506.

In system 500, there may be more than one of each type of user equipment device but only one of each is shown in FIG. 5 to avoid overcomplicating the drawing. In addition, each user may utilize more than one type of user equipment device and also more than one of each type of user equipment device. In some embodiments, a user equipment device (e.g., user television equipment 502, user computer equipment 504, wireless user communications device 506) may be referred to as a "second screen device" or "secondary device."

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communications paths, such as those described above in connection with paths 508, 510, and 512, as well as other short-range point-to-point communications paths, such as USB cables, IEEE 1394 cables, wireless paths (e.g., Bluetooth, infrared, IEEE 702-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes media content source 516, content database 524 and user profile database 518 coupled to communications network 514 via communications paths 520 and 522, respectively. Paths 520 and 522 may include any of the communications paths described above in connection with paths 508, 510, and 512. Communications may be exchanged over one or more communications paths, but are shown as a single path in FIG. 5 to avoid overcomplicating the drawing. In addition, there may be more than one of each of media content source 516, content database 524 and user profile database 518, but only one of each is shown in FIG. 5 to avoid overcomplicating the drawing. (The different types of each of these sources are discussed below.) If desired, media content source 516, content database 524 and user profile database 518 may be integrated as one module. Although communications between sources 516, 524 and 518 with user equipment devices 502, 504, and 506 are shown as through communications network 514, in some embodiments, sources 516 and 518 may communicate directly with user equipment devices 502, 504, and 506 via communications paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application running on control circuitry of the remote server. When executed by control circuitry of the remote server, the media guidance application may instruct the control circuitry to generate the guidance application displays and transmit the generated displays to the user equipment devices.

Content data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT. In addition to content data, providers of OTT content can distribute media guidance applications (e.g., web-based applications or cloud-based applications), or the content can be displayed by media guidance applications stored on the user equipment device.

In an example approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources and one or more content data sources and one or more databases. In addition or in the alternative, the remote computing sites may include other user equipment devices, such as user television equipment 502, user computer equipment 504, and wireless user communications device 506. For example, the other user equipment devices may provide access to a stored copy of a video or a streamed video.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3 and FIG. 4.

Figure 6:
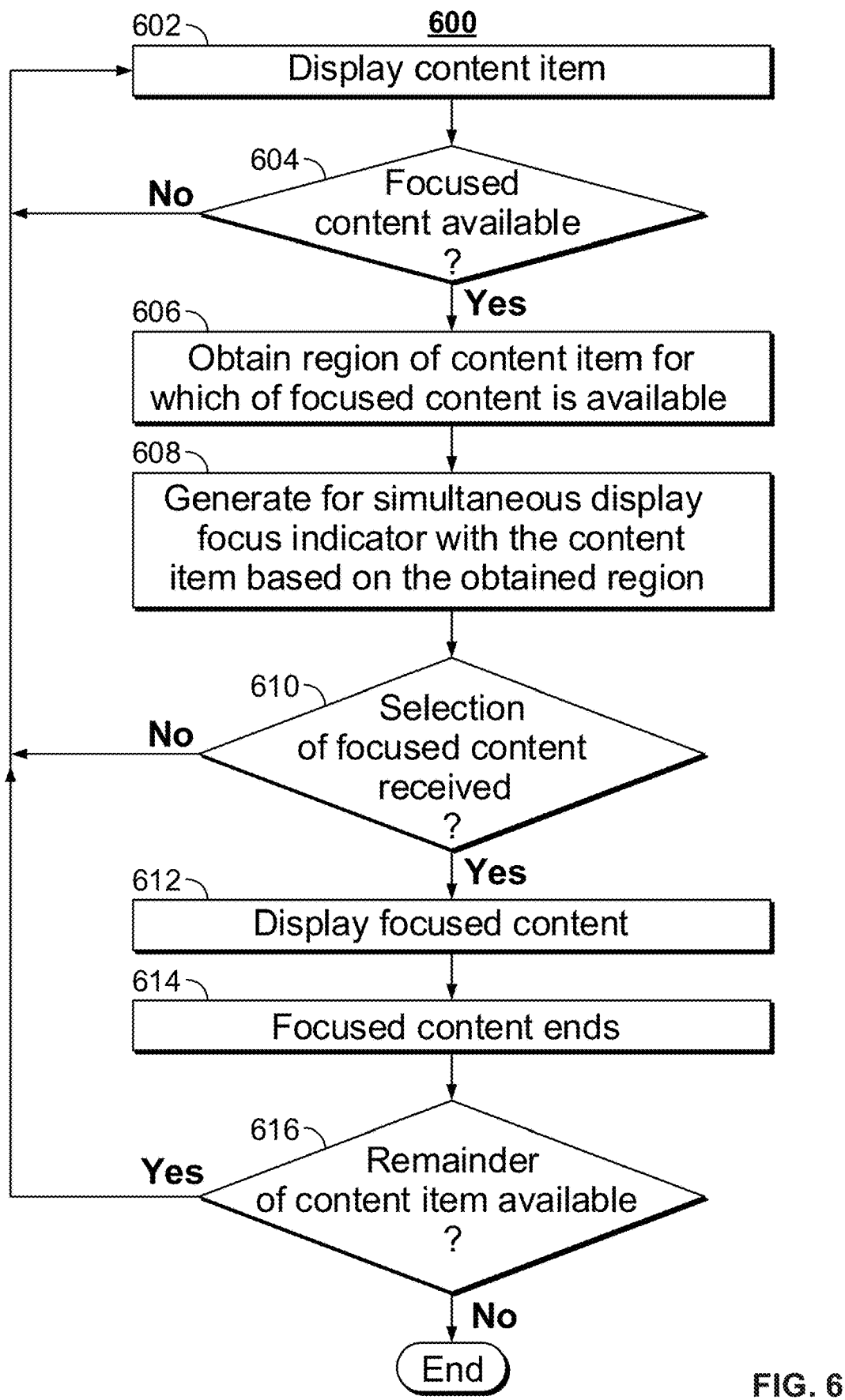
FIG. 6 shows a flowchart of illustrative steps for presenting a focused display of content, in accordance with some embodiment of the present disclosure.

FIG. 6 shows a flowchart of illustrative steps for presenting a focused display of content, in accordance with some embodiments of the present disclosure. The process 600 may be executed by control circuitry, for example, control circuitry 304 or 400. The control circuitry may be part of user equipment (e.g., user television equipment 502, user computer equipment 504, or wireless user communications device 506) or of a remote server separated from the user equipment by way of a communications network, or distributed over a combination of both. It should be noted that process 600, or any step thereof, could be performed on, or provided by, any of the devices shown in FIGS. 1 and 3-5 and can incorporate various user interfaces (e.g., user input interface 310 of FIG. 3). In addition, one or more steps of the process depicted in FIG. 6 may use a manifest file such as master playlist 202 for presenting a content item and corresponding focused content.

The process 600 begins at step 602, where the control circuitry (e.g., of user device 502, 504, or 506) generates for display a content item. For example, the control circuitry may use a master playlist 202 to access segments of the content item from media content source 516 in order to generate the content item for display. The control circuitry may output the content item for display on display 312. As another example, a user's smartphone (e.g., the computing device 202) may access the content item through a cloud storage service by connecting to a home Wi-Fi network (i.e., communications network 514).

At step 604, the control circuitry determines whether focused content is available for the content item. In some embodiments, the control circuitry accesses an index map (e.g., index map 208) in a manifest file (e.g., master playlist 202) for the content item to determine whether focused content is available. The index map can identify when, during presentation of the content item, one or more items of focused content are available. For example, the index map can identify which segment or segments of the content item have corresponding focused content. As another example, the index map can identify the frames (e.g., by time or frame number) of the content item for which focused content is available. In some embodiments, more than one item of focused content can be available. If the control circuitry determines that focused content is not available ("No" at 604), the process 600 may return back to 602 and continue to display the content item. Otherwise, if the control circuitry determines that focused content is available, ("Yes" at 604), the process 600 may proceed to step 606.

At step 606, the control circuitry obtains the region of the content item for which the focused content is available. In some embodiments, the index map identifies the region of the content item. For example, the index map may identify the coordinate location of the region (e.g., the X,Y pixel coordinate location). In some embodiments, the coordinate location identifies the center of the region or any other characteristic of the region (e.g., a bottom right corner of the region) and therefore it can be a single X,Y coordinate location. The following table illustrates an exemplary index map that identifies the coordinate location of the region of the content item for a master playlist.

| Bitrate Variant | Segment | Coordinates | Focused Playlist Index |
|---|---|---|---|
| 1 | 2 | (190, 720) | 2 |
| 1 | 2 | (190, 190) | 1 |
| 2 | 1 | (0, 720) | 2 |
| 2 | 1 | (100, 190) | 3 |

In this example, the index map identifies the bitrate variants and segments of the content item for which focused content is available, the corresponding region of the content item to which the focused content pertains, as well as the focused playlist index number for the focused content. In some embodiments, the coordinate location identifies the four corners of the region. In some embodiments, the region of the content item is identified using metadata. For example, the metadata may include information about an object in the region (e.g., a building description, an object shape, or an object color) and the control circuitry uses the metadata information to locate the object in the content item (e.g., using image processing analysis) to obtain the region.

At step 608, the control circuitry generates for simultaneous display a focus indicator with the content item based on the obtained region. In some embodiments, the focus indicator comprises a highlighted region overlay that identifies, to a viewer, the region of the content item for which focused content is available. For example, the highlighted region may be the outline of a rectangular shape as shown, for example, in FIG. 1. The control circuitry may determine the color of the outline based on the background color of the content item to ensure that sufficient contrast exists. For example, when the content item in the region is dark, the color of the outline can be selected to be white, whereas when the content item in the region is light, the color of the outline can be selected to be black. The size and/or location of the highlighted region can be determined based on the obtained region of the content item. For example, when the obtained region identifies the coordinate location of the center of the region, the highlighted region can be centered at that coordinate location. When the obtained region identifies the four corners of the region, the corner locations can be used to set the corners of the highlighted region. In an illustrative example, if the content item is a soccer game and items of focused content are determined to be available for three soccer players, the control circuitry can generate for simultaneous display three focus indicators, highlighting each of the players in the game for whom focused content is available. In this example, as the soccer players move within the frame of the content item, the corresponding focus indicators can also move to the track the soccer players. In some embodiments, this is achieved by the control circuitry performing object tracking. In some embodiments, the obtained region comprises the location of the region over time, and the control circuitry uses this information to change the location of the focus indicator. It will be understood that any suitable type of focus indicator (e.g., a circular highlighted region or text overlay) can be used to identify availability of focused content to a viewer.

At step 610, the control circuitry determines whether a selection of focused content is received. For example, the control circuitry may receive a selection of focused content from a user via user input interface 310. When user input interface 310 is a touchscreen integrated into a display (e.g., display 312), the user can select the focused content by touching (e.g., tapping or pressing) the area of the display corresponding to the displayed focus indicator, which causes a signal to be generated and transmitted to the control circuitry. When user input interface 310 is a remote control, the user can select the focused content by pressing a remote control key (e.g., "select" or "enter"). If multiple focus indicators are displayed, the user can navigate to a desired focus indicator using directional keys on the remote control before selecting the focus indicator. When the user device is a computer and user input interfaced 310 is a mouse, the user can select the focused content by moving a cursor with the mouse to a focus indicator and selecting a mouse key. In some embodiments, the focused content is automatically selected based on user preferences or user behavior (e.g., based on previous user selections of focused content). If the control circuitry determines that focused content is not selected ("No" at 610), the process 600 may return back to 602 and continue to display the content item. For example, the control circuitry may wait a predetermined amount of time (e.g., 5 seconds) before removing the focus indicator and returning to 602. Otherwise, if the control circuitry determines that a selection of focused content is received, ("Yes" at 610), the process 600 may proceed to step 612.

Figure 7:
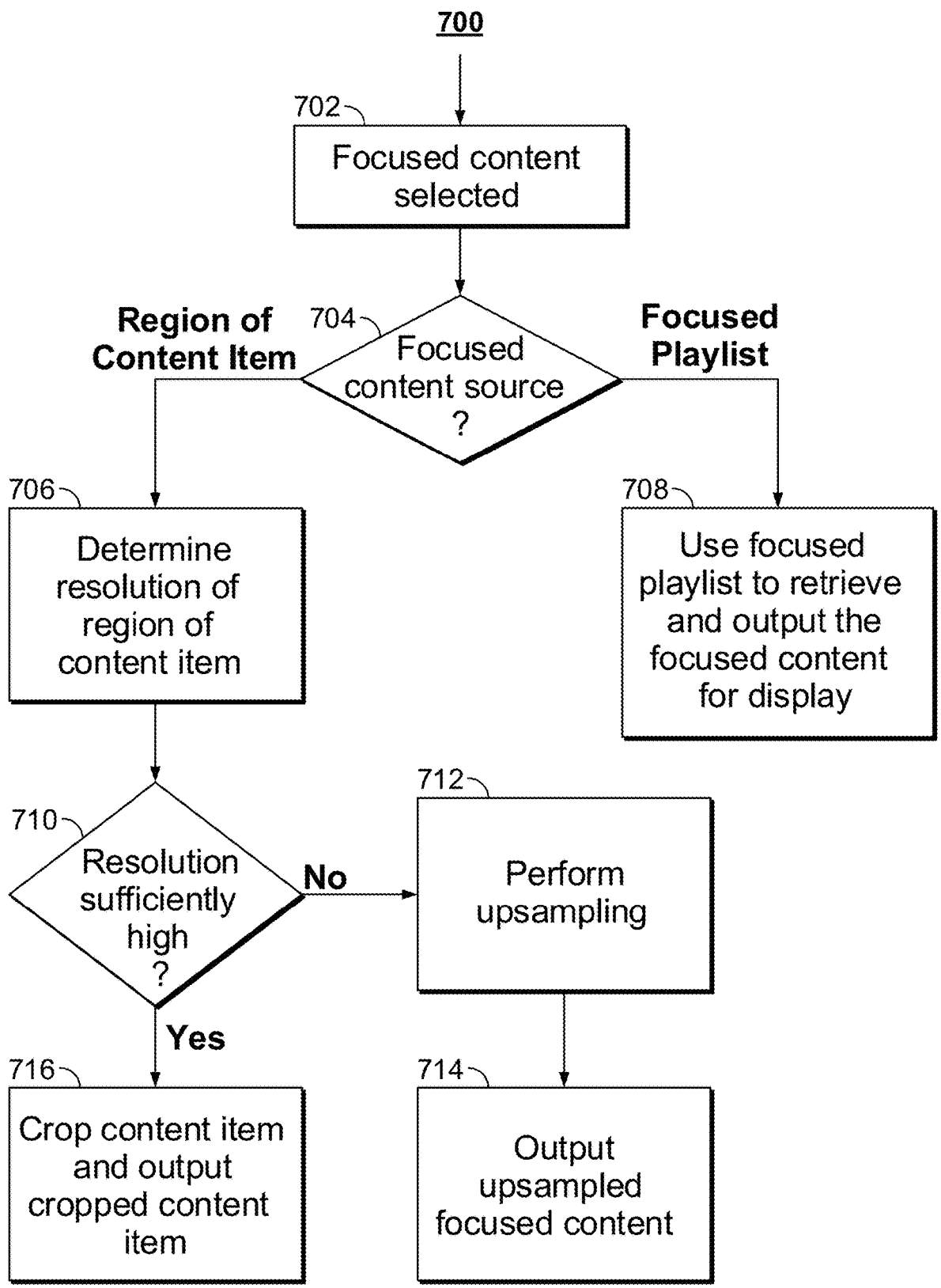
FIG. 7 shows a flowchart of illustrative steps for generating for display focused content, in accordance with some embodiments of the present disclosure.

At step 612, the control circuitry generates for display the selected focused content. Referring back to the exemplary index map table above, when a particular item of focused content is selected, the control circuitry can use the identified focused playlist index (e.g., within the master playlist as illustrated in FIG. 2) to retrieve and generate for display the focused content. More generally, the index map can identify the focused content using any suitable information or data structure to enable the control circuitry to generate the focused content for display. In some embodiments, the focused content is a region of the content item that is enlarged for display. In such embodiments, the control circuitry can enlarge the region by, for example, extracting the region from the content item or cropping around the region and performing upsampling of the region to match resolution of the content item. In some embodiments, process 700 of FIG. 7 is performed at step 612. The focused content can be displayed, for example, via display 312 of computing device 300 or via a display of any device of user equipment system 500 (e.g., user television equipment 502, user computer equipment 504, or wireless communication device 506).

At step 614, the focused content ends. Depending on the content item and available focused content, the focused content may exist for the remainder of the content item or for only a portion or portions of the content item. Therefore, when the focused content ends, at step 616, the control circuitry determines whether a remainder of the content item is available. If the control circuitry determines that a remainder of the content item is available ("Yes" at 616), the process 600 may return back to 602 and continue to display the content item. For example, the control circuitry may switch from focused playlist 210 of FIG. 2 back to video playlist 206 and audio playlist 204 of master playlist 202. Otherwise, if the control circuitry determines that a remainder of the content item is not available, ("No" at 616), the process 600 ends. For example, the control circuitry can stop displaying the focused content and return to a main menu of the user device.

FIG. 7 shows a flowchart of illustrative steps for generating for display focused content, in accordance with some embodiments of the present disclosure. The process 700 may be executed by control circuitry, for example, control circuitry 304 or 400. The control circuitry may be part of user equipment (e.g., user television equipment 502, user computer equipment 504, or wireless user communications device 506) or of a remote server separated from the user equipment by way of a communications network, or distributed over a combination of both. It should be noted that process 700, or any step thereof, could be performed on, or provided by, any of the devices shown in FIGS. 1 and 3-5. In addition, one or more steps of the process depicted in FIG. 7 may use a manifest file such as master playlist 202 for presenting focused content. In some embodiments, one or more steps of process 700 are performed as part of step 612 of FIG. 6.

The process 700 begins at step 702, where the control circuitry (e.g., of user device 502, 504, or 506) determines that focused content is selected. In some embodiments, step 720 corresponds to step 610 of FIG. 6 where output of the decision block is "Yes."

At step 704, the control circuitry determines the source of the focused content. When the content item is generated using master playlist 202, index map 208 may identify the source of the focused content. For example, as illustrated, index map 208 may identify focused playlist 210 as the source of the focused content ("Focused Playlist" at 704), where focused playlist 210 comprises audio playlist 228 (e.g., a m3u file) and a video playlist 230 (e.g., a m3u file). As another example, the index map may identify a region of the content item to be enlarged as the focused content ("Region of Content Item" at 704). For example, the index map may identify the boundary coordinates of the region to be enlarged. If the control circuitry determines that the source of the focused content is separate content, such as focused playlist 210, the process 700 proceeds to step 708. Otherwise, if the control circuitry determines that the source of the focused content is a region of the content item, the process 700 proceeds to step 706.

At step 708, where the focused content is separate content, the control circuitry retrieves the separate content and outputs the focused content for display. For example, when the focused content is identified as focused playlist 210, the control circuitry uses the audio playlist 228 and video playlist 230 to retrieve the segments of the focused content (e.g., from media content source 516) and outputs the focused content for display (e.g., on display 312). In some embodiments, one or more bitrate variants of the focused content are available. For example, the bitrate variant of the focused content can be selected to correspond to the bitrate variant of the content item being displayed. As another example, the bitrate variant can be selected based on properties of the network used to access the focused content to ensure an uninterrupted streaming experience.

At step 706, where the focused content is a region of the content item, the control circuitry determines the resolution of region of content item to be enlarged. For example, the index map may identify the boundary coordinates of the region to be enlarged, and the control circuitry can use the boundary coordinates to compute the X,Y pixel resolution of the focused content. As another example, the index map may identify the center coordinate of the region of the content item and additionally specify a size (e.g., an absolute size (e.g., in pixels) or relative size (e.g., a percentage)) of the region to be enlarged.

At step 710, the control circuitry determines whether the resolution of the region of the content item is sufficiently high. For example, the control circuitry can compare the determined resolution to a threshold resolution. Any suitable threshold resolution can be used as appropriate for the user device. For example, the threshold resolution can be 480p (16:9) or 720p (16:9). If the control circuitry determines that the resolution is not sufficient, ("No" at 710), the process 700 may proceed to step 712. If the control circuitry determines that the resolution is sufficient ("Yes" at 710), the process 700 may proceed to step 716.

At step 712, where the resolution is not sufficient, the control circuitry may perform upsampling. In some embodiments, the upsampling is performed to match the resolution of the content source, such that the resolution of the output for display remains the same. In some embodiments, upsampling is performed to match the threshold resolution. In some embodiments, step 720 uses upsampling process 800 of FIG. 8 to perform the upsampling. In one example, if the content item has 4K resolution, the focused region has 480p resolution, and the threshold resolution is 1K, the focused region can be upsampled to either 1K to match the threshold resolution or 4K to match the resolution of the content item. In some embodiments, the upsampling includes an initial step of cropping the content item to generate the focused resolution. In some embodiments, the upsampling is performed on a subset of pixels of the content item corresponding to the focused content.

At step 714, the control circuitry outputs the upsampled focused content for display. For example, the control circuitry may utilize output circuitry 428 to output the upsampled focused content for display.

At step 716, where the resolution of the focused content is sufficient, the control circuitry crops the content item and outputs the cropped content as the focused content. For example, the control circuitry may extract and output only the pixels corresponding to the focused content within the content item. As another example, the control circuitry may first remove the cropped content to generate reduced resolution content corresponding to the focused content and then output the reduced resolution content as the focused content. The cropped content can be outputted utilizing output circuitry 428 for display.

Figure 8:
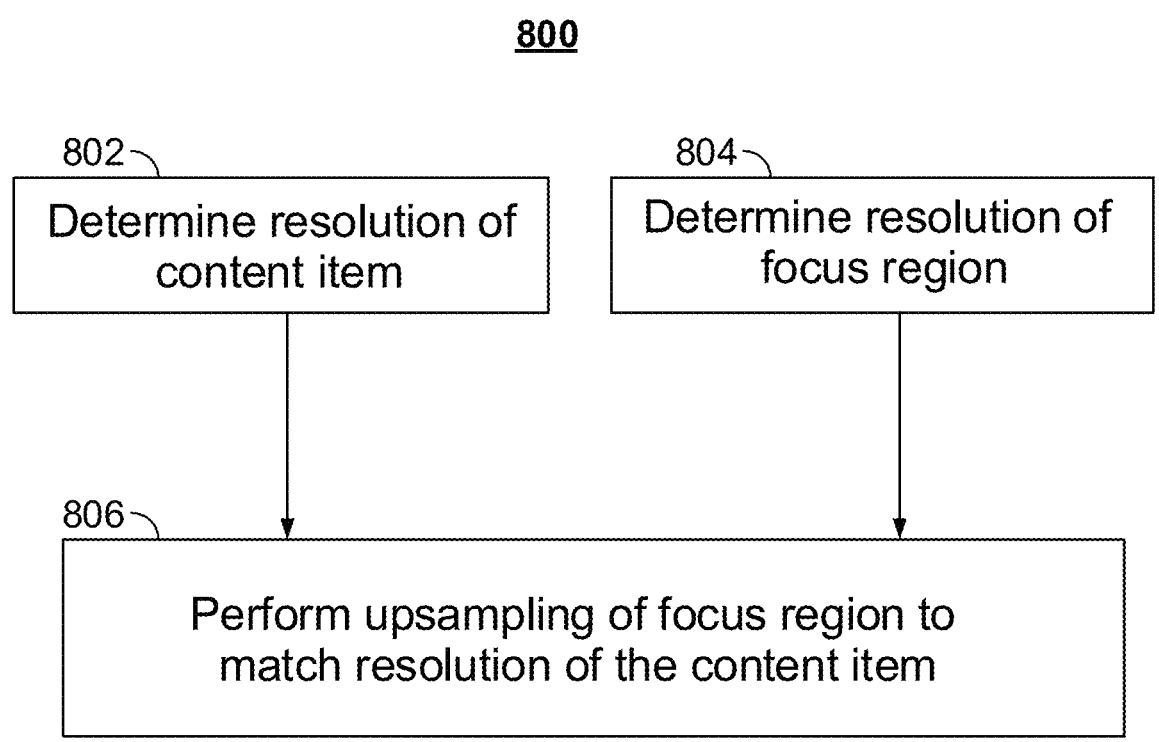
FIG. 8 shows a flowchart of illustrative steps for upsampling a region of a content item to generate focused content, in accordance with some embodiments of the present disclosure.

FIG. 8 shows a flowchart of illustrative steps for upsampling a region of a content item to generate focused content, in accordance with some embodiments of the present disclosure. The process 800 may be executed by control circuitry, for example, control circuitry 304 or 400. The control circuitry may be part of user equipment (e.g., user television equipment 502, user computer equipment 504, or wireless user communications device 506) or of a remote server separated from the user equipment by way of a communications network, or distributed over a combination of both. It should be noted that process 800, or any step thereof, could be performed on, or provided by, any of the devices shown in FIGS. 1 and 3-5. In addition, one or more steps of the process depicted in FIG. 8 may use a manifest file such as master playlist 202 for presenting focused content. In some embodiments, one or more steps of process 800 are performed as part of step 612 of FIG. 6 or step 712 of FIG. 7.

At step 802, the control circuitry determines the resolution of content item. The control circuitry may analyze the content item to determine its resolution (e.g., 1K, 2K, or 4K). For example, where master playlist 202 is used to generate for display the content item, the bitrate variant (e.g., bitrate variant 1 or 2) can be used to determine the resolution of the content item.

At step 804, the control circuitry determines the resolution of the focus region. For example, the index map may identify the boundary coordinates of the region to be enlarged, and the control circuitry can use the boundary coordinates to compute the X,Y pixel resolution of the focused content. As another example, the index map may identify the center coordinate of the region of the content item and additionally specify a size (e.g., an absolute size (e.g., in pixels) or relative size (e.g., a percentage)) of the region to be enlarged. As another example, metadata may be used to identify the region of content that is available to be focused (e.g., a main entrance of a government building). The control circuitry may perform image analysis on the content item to identify the size of the focus object, which is then used to determine the resolution of the focus region (e.g., to determine a 16:9 region that encompasses the focus object).

At step 806, the control circuitry performs upsampling of the focus region to match resolution of the content item. The process of upsampling includes adding additional pixels to the focus region to match the content resolution. For example, the resolution of a focus region could be increased by a factor of 4 by converting each pixel to a cluster or 4 pixels, each having identical pixel values. While this increases the resolution, this can cause curves and angles to appear blocky. Accordingly, in some embodiments, linear interpolation can be used to resample the focused content to achieve the desired resolution. For example, if the focused region has a resolution of 480p and the content item has a resolution of 4K, the focused region can be upsampled using linear interpolation to a resolution of 4K to match the resolution of the content item.

It will be understood that process 800 of FIG. 8 can be used to upsample the focus region to any desired resolution (e.g., a minimum resolution threshold). It will also be understood that process 800 of FIG. 8 can be used to upsample any focused content to a different desired resolution.

Figure 9:
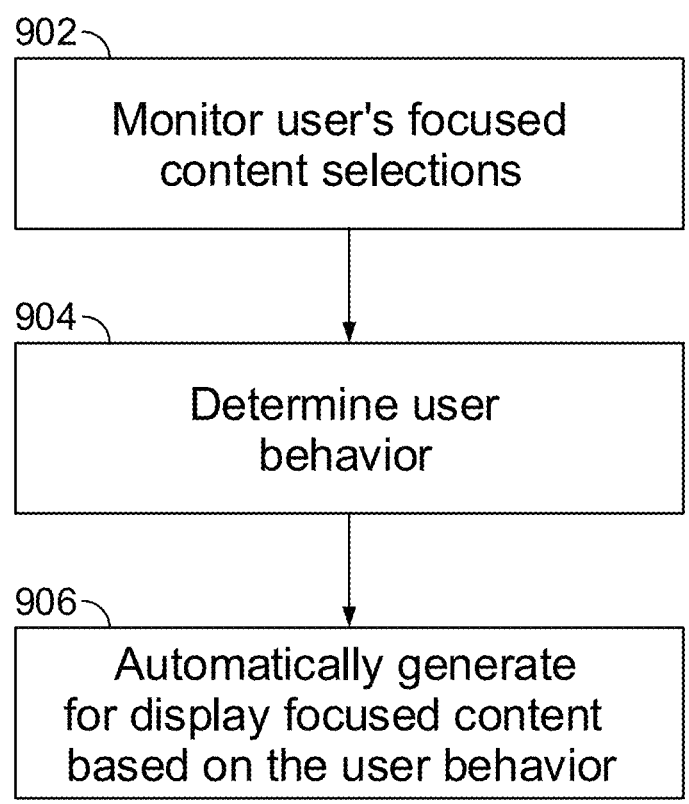
FIG. 9 shows a flowchart of illustrative steps for determining user behavior based on selections to present focused content and automatically generating for display focused content based on the user behavior, in accordance with some embodiments of the present disclosure.

FIG. 9 shows a flowchart of illustrative steps for determining user behavior based on selections to present focused content and automatically generating for display focused content based on the user behavior, in accordance with some embodiments of the present disclosure. The process 900 may be executed by control circuitry, for example, control circuitry 304 or 400. The control circuitry may be part of user equipment (e.g., user television equipment 502, user computer equipment 504, or wireless user communications device 506) or of a remote server separated from the user equipment by way of a communications network, or distributed over a combination of both. It should be noted that process 900, or any step thereof, could be performed on, or provided by, any of the devices shown in FIGS. 1 and 3-5. In addition, one or more steps of the process depicted in FIG. 9 may be used to perform steps 610 and 612 of FIG. 6 for selecting and displaying focused content.

At step 902, the control circuitry monitors a user's focused content selections. In some embodiments, a user's selections of focused content at step 610 are monitored. For example, the focused content or the index map that identifies focused content may include metadata or other information that identifies the object or subject of the focused content selected by the user. This information can be monitored and stored in, for example, a user profile for later access or analysis. For example, the user's previous focused content selections may include a user's favorite soccer player, favorite actor, or favorite national landmark. The control circuitry may track the user's viewing habits (e.g., what they're watching, how frequently they're watching, objects of interest they select) and store the previous focused content selections in storage 308 (e.g., RAM, ROM, hard disk, removable disk, etc.). The control circuitry may work in collaboration with either control circuitry 400 or user equipment system 500 to store the user's previous focused content selections in user profile database 418 or user profile database 518.

At step 904, the control circuitry determines user behavior. For example, the control circuitry may access user profile database 418 or user profile database 518 to determine the user's preferences and analyze their habits. For example, if the user frequently watches soccer, the control circuitry may determine the user supports Manchester United based on viewing history and that their favorite player is Paul Pogba due to the number of previous focused content selections of Paul Pogba. In another example, if the user frequently watches nature documentaries, the control circuitry may determine the user's favorite animal is the lion based on the number of previous focused content selections of lions.

At step 906, the control circuitry automatically generates for display focused content based on the user behavior. The display of focused content may occur at display 312 via control circuitry 304. The control circuitry may access a user profile database (e.g., user profile database 418 or user profile database 518) and access user preferences and behavior stored in the user profile database to automatically generate displayed focused content. For example, as described above, if the user preferences indicate that Paul Pogba is a favorite player of the user, the next time the user watches a Manchester United game the control circuitry may automatically generate for display a focused image of Paul Pogba. This provides the user with a dynamic display of the content that is tailored to the user's viewing habits.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for presenting a focused display of content, comprising:
   receiving a master playlist, wherein the master playlist comprises an index map and a focused playlist;
   accessing the index map for a content item, wherein the index map identifies locations of a plurality of objects in a plurality of frames of the content item, and wherein the focused playlist identifies a subset of the plurality of objects of the content item to focus on, wherein the focused playlist is separate from the index map;
   receiving a selection to present the focused content;
   accessing the focused playlist to determine whether an object of interest is available in a particular frame of the plurality of frames of the content item;
   accessing the index map for the content item to identify a portion of the particular frame indicated by the focused playlist to depict the object of interest;
   generating for display the content item; and
   generating for display, in response to receiving the selection, the focused content, by modifying the identified portion of the particular frame.

2. The method of claim 1, further comprising generating for display, simultaneously with the content item, an indicator of the portion of the particular frame indicated by the focused playlist of the content item for which the focused content is available.

3. The method of claim 1, wherein the index map comprises coordinates of the portion of the particular frame indicated by the focused playlist.

4. The method of claim 1, wherein generating for display the focused content comprises generating for display an enlarged view of the portion of the particular frame by cropping the content item based on the index map.

5. The method of claim 4, wherein generating for display the enlarged view of the portion of the particular frame comprises upsampling the portion of the particular frame of the content item to generate the enlarged view.

6. The method of claim 1, wherein the index map correlates the content item to the focused content based on metadata.

7. The method of claim 1, wherein the master playlist further comprises:
   a video playlist for the content item, wherein the video playlist identifies a plurality of segments that comprise the content item; and
   an audio playlist for the content item, wherein the audio playlist identifies a plurality of segments that comprise the content item.

8. The method of claim 7, wherein the focused playlist identifies one or more segments that comprise the focused content, and wherein generating for display the focused content comprises switching from a segment of the video playlist for the content item to a segment of the focused playlist for the focused content.

9. The method of claim 1, further comprising:
   determining user behavior based on selections to present the focused content; and
   automatically generating for display the focused content based on the user behavior.

10. A system for presenting a focused display of content, the system comprising:
    a communication port; and
    control circuitry communicably coupled to the communication port and configured to:
      receive a master playlist, wherein the master playlist comprises an index map and a focused playlist;
      access, at the communication port, the index map for a content item, wherein the index map identifies locations of a plurality of objects in a plurality of frames of the content item and wherein the focused playlist identifies a subset of the plurality of objects of the content item to focus on, wherein the focused playlist is separate from the index map;
      receive a selection to present the focused content;
      access the focused playlist to determine whether an object of interest is available in a particular frame of the plurality of frames of the content item;
      access the index map for the content item to identify a portion of the particular frame indicated by the focused playlist to depict the object of interest;
      generate for display the content item;
      and
      generate for display, in response to receiving the selection, the focused content, by modifying the identified portion of the particular frame.

11. The system of claim 10, wherein the control circuitry is further configured to generate for display, simultaneously with the content item, an indicator of the portion of the particular frame indicated by the focused playlist of the content item for which the focused content is available.

12. The system of claim 10, wherein the index map comprises coordinates of the portion of the particular frame indicated by the focused playlist.

13. The system of claim 10, wherein the control circuitry is configured to generate for display the focused content by generating for display an enlarged view of the portion of the particular frame by cropping the content item based on the index map.

14. The system of claim 13, wherein the control circuitry is configured to generate for display the enlarged view by upsampling the portion of the particular frame of the content item to generate the enlarged view.

15. The system of claim 10, wherein the index map correlates the content item to the focused content based on metadata.

16. The system of claim 10, wherein the master playlist further comprises:
   a video playlist for the content item, wherein the video playlist identifies a plurality of segments that comprise the content item; and
   an audio playlist for the content item, wherein the audio playlist identifies a plurality of segments that comprise the content item.

17. The system of claim 16, wherein the focused playlist identifies one or more segments that comprise the focused content, and wherein generating for display the focused content comprises switching from a segment of the video playlist for the content item to a segment of the focused playlist for the focused content.

18. The system of claim 10, wherein the control circuitry is further configured to:
   determine user behavior based on selections to present the focused content; and
   automatically generate for display the focused content based on the user behavior.

* * * * *